March 8, 1949.  C. L. JONES  2,464,089
METHOD AND APPARATUS FOR PRODUCING
COMPOSITE SOLID CARBON DIOXIDE
Filed Oct. 11, 1944  3 Sheets-Sheet 1

Inventor
Charles L. Jones
By Peck + Peck
Attorneys

March 8, 1949.  C. L. JONES  2,464,089
METHOD AND APPARATUS FOR PRODUCING
COMPOSITE SOLID CARBON DIOXIDE Filed Oct. 11, 1944  3 Sheets-Sheet 2

Inventor
Charles L. Jones
By Peck & Peck
Attorneys

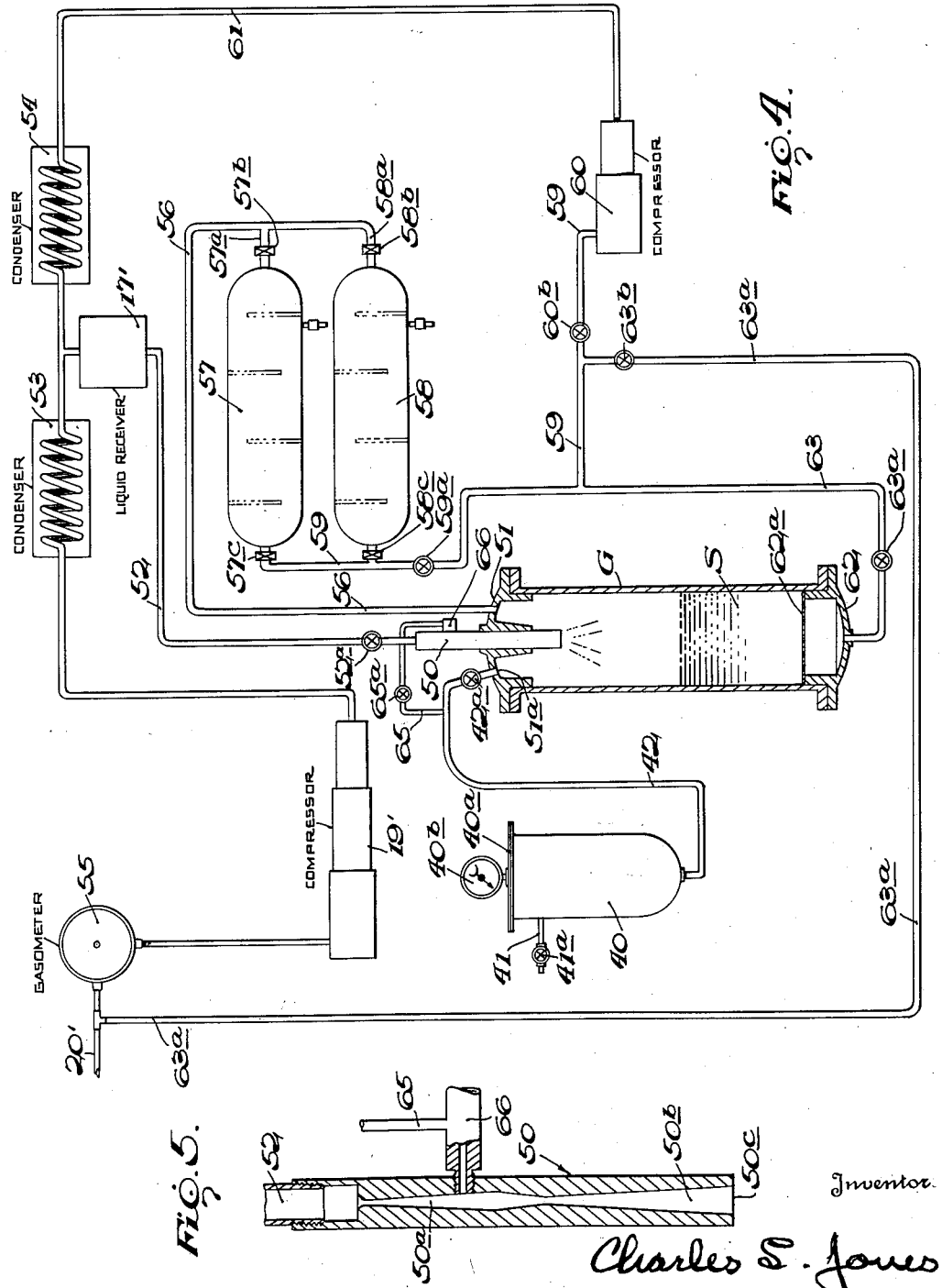

Patented Mar. 8, 1949

2,464,089

UNITED STATES PATENT OFFICE 2,464,089

METHOD AND APPARATUS FOR PRODUCING COMPOSITE SOLID CARBON DIOXIDE

Charles L. Jones, New York, N. Y., assignor to International Carbonic Engineering Company, Wilmington, Del., a corporation of Delaware Application October 11, 1944, Serial No. 558,216

36 Claims. (Cl. 62—121)

This invention relates to certain improvements in and relating to composite solid carbon dioxide and methods and apparatus for producing the same; and the nature and objects of the invention will be readily recognized and understood by those skilled in the arts involved, in the light of the following explanation of the nature and characteristics of a composite solid carbon dioxide of my invention, and of the following detailed description of the methods and of the apparatus for carrying out such methods, which apparatus I have illustrated in the accompanying drawings in what I now consider to be preferred embodiments or mechanical expression of such apparatus, from among various other embodiments, forms, designs, constructions and combinations by which my invention is capable of expression within the broad spirit and scope hereof.

My present invention concerns the manufacture of composite solid carbon dioxide, that is, solid carbon dioxide to which another ingredient or substance or ingredients or substances has or have been added for the purpose of modifying or changing the physical and structural characteristics and/or the refrigerating effect of the solid carbon dioxide to which such ingredient or substance has been added; and the invention is primarily directed to the provision of improved methods and apparatus for efficiently commercially forming and producing such composite carbon dioxide in such a manner that the added ingredient or substance or ingredients or substances, will be disposed in and distributed through the solid carbon dioxide to produce a composite solid carbon dioxide that will be a homogeneous mass having the desired strength and physical structure and characteristics to enable the composite solid carbon dioxide to be practically and efficiently utilized to attain the desired results therefrom in use.

One of the specific types and characters of composite solid carbon dioxide with which my invention is especially concerned, is a solid carbon dioxide to which water alone, or water with some other ingredient or substance, has been added, that is to say so-called "hydrated" solid carbon dioxide; and one of the primary objects of my invention is to provide methods and apparatus by which water may be added to the solid carbon dioxide in a more uniform distribution throughout the mass of solid carbon dioxide in order to produce a "hydrated" composite solid carbon dioxide of a homogeneous and strong physical and structural character, so that, upon evaporation of such composite or "hydrated" solid carbon dioxide a more uniform and effective "insulating blanket" of water snow will be formed and maintained on and around and enclosing the mass of composite solid carbon dioxide during the evaporation or sublimation of the composite mass.

Solid carbon dioxide in block or cake form has been extensively used as a refrigerant for a number of years, and I have disclosed in my U. S. Patent No. 2,020,189, dated November 5, 1935, methods of improving the physical structure and of modifying the refrigerating action of solid carbon dioxide, by the addition thereto of water, oil and other substances or ingredients. It is also known and recognized that the refrigerating effect of solid carbon dioxide can be modified by hydrating the solid carbon dioxide by the addition of water in such a manner as to produce a hydrated composite solid carbon dioxide containing water-ice particles, and such hydrated composite solid carbon dioxide and a method of producing it is disclosed and set forth in the U. S. patent to Josephson 1,927,175, dated September 19, 1933. With a hydrated composite solid carbon dioxide such as disclosed by Josephson in U. S. Patent No. 1,927,175, and such as disclosed by me in my above referred to U. S. Patent 2,020,189, the modification of the refrigerating effect of the hydrated composite solid carbon dioxide is obtained due to the fact that when the composite solid carbon dioxide sublimes or evaporates a skeletally continuous insulating blanket of water-ice particles remains as a coating over and covering the mass or block of solid carbon dioxide and such "blanket" functions to regulate the refrigerating effect and to prolong the sublimation or evaporation of the mass of hydrated composite solid carbon dioxide.

It has been found in actual practice that the methods and apparatus disclosed by Josephson in the U. S. Patent No. 1.927.175, are not efficient for low cost, continuous operation for large scale production, such as required under present day conditions in the commercial manufacture of solid carbon dioxide, due primarily to the fact that the hydrated solid carbon dioxide must be rehandled after initial production by removing the same from the apparatus to a separate pressing apparatus in which the hydrated solid carbon dioxide is then pressed and formed into cakes and blocks. Such removal and rehandling results in considerable losses from evaporation or sublimation. Further, it has been found that the Josephson apparatus under the conditions of large scale continuous production requires frequent shutdowns in order to clean out the apparatus, and maintain it in efficiently operative condition with consequent loss in production and increased costs. In the use of the Josephson method and apparatus it is difficult to obtain the highly desirable uniform and even dispersion and distribution of the water-snow in and through the solid carbon dioxide, with the result that the hydrated solid carbon dioxide produced in accordance with the teachings of the above referred to Josephson patent, contains fractures, fissures and is of uneven hardness and non-uniform density, causing the composite solid carbon dioxide to melt or evaporate in an uneven or non-uniform manner, all of which characteristics and conditions tend to detract from the practical utility and to limit the range of practical usefulness of the hydrated composite solid carbon dioxide so produced.

With the methods disclosed in my above referred to U. S. Patent 2,020,189, the added ingredients or substances may be very uniformly and efficiently dispersed and distributed in and throughout the mass of solid carbon dioxide, but may only be so dispersed up to the limit of solubility of the ingredients or substances in the liquefied carbon dioxide at the temperature actually employed in feeding or supplying the apparatus for solidifying the liquid carbon dioxide. When larger quantities of the ingredients or substances are injected into the liquefied carbon dioxide for solidification to form the composite solid carbon dioxide, the excess of the injected ingredient or substance is merely carried around in the liquid carbon dioxide in an undissolved condition through the liquefaction and liquid cooling system, and such excess segregates into pockets in condensers, pipes, evaporators, and the like, in the system, until "slugs" of the added ingredient or substance are carried into the apparatus in which the liquid carbon dioxide is solidified. If however, the percentage of the added ingredient or substance, such for example, as water in forming a hydrated solid carbon dioxide, is held within the limits of solubility of the liquid carbon dioxide in order to produce a structurally superior product by this method, the mechanical properties of strength, storage life and impact resistance of the composite carbon dioxide may be greatly improved as described and explained in my U. S. Patent No. 2,020,189, but the refrigerating characteristics of the composite carbon dioxide are not modified like the hydrated composite solid carbon dioxide produced in accordance with the methods of the Josephson U. S. Patent 1,927,175, because the amount of the added high melting point ingredient or substance, in such instance the water, is not sufficient to form a coherent structurally strong and sustaining "insulating blanket" of water-snow when the hydrated composite solid carbon dioxide evaporates and sublimes.

By my present invention I have devised a method or process of manufacturing dense, structurally sound and strong blocks or cakes of composite solid carbon dioxide, for example such as a hydrated composite solid carbon dioxide, by which it is possible to produce a composite solid carbon dioxide of a character such that upon evaporation or sublimation thereof a coherent skeletally continuous "insulating snow-blanket" will be formed thereon completely covering and enclosing the mass or block of composite solid carbon dioxide, which "blanket" will materially and substantially modify and control the refrigerating effect of the solid carbon dioxide. The extent or degree of the control and modification of the refrigerating effect of the "insulating snow blanket," can be determined and controlled by the character and amount or percentage of the ingredient or substance which is to be added to the pure carbon dioxide to form therewith the composite solid carbon dioxide. While this "insulating snow-blanket" is generally similar to that described in the Josephson U. S. Patent 1,927,175, the "blanket" of the composite solid carbon dioxide of and produced by the method of my invention has greatly improved physical properties and characteristics over those obtained with the composite solid carbon dioxide produced in accordance with the methods and apparatus of the aforesaid Josephson patent.

An important feature of the methods of my invention resides in the fact that such methods may be practiced and carried out in conjunction and association with and without substantial change or modification in, the generally prevailing commercial methods of producing solid carbon dioxide, and without substantial change in or redesigning of existing and generally used equipment and apparatus for the commercial solidification of carbon dioxide, it being only necessary to add to such existing apparatus relatively simple and inexpensive equipment which may, if desired, be made up from more or less standard or conventional stock materials, but which preferably, in order to obtain the most efficient results from the use of my methods, will consist of the specially designed nozzle apparatus of my present invention such as disclosed herein in one of its possible forms and adaptations. Hence, an advantageous result from the use of the methods of my invention is that the composite solid carbon dioxide can be formed and produced in existing commercial plants by utilizing existing solidification methods and apparatus, and without substantial increase in cost of production of the composite carbon dioxide over the cost of manufacturing pure solid carbon dioxide in such plants.

Those methods of forming and commercially producing composite solid carbon dioxide of my invention, which are adapted for use in association and conjunction with the more generally employed methods of commercially producing pure solid carbon dioxide in which a press chamber is charged with solid carbon dioxide by evaporating a body of liquid carbon dioxide confined in the press chamber, are basically characterized by the step of injecting or discharging the ingredients or substances to be added to form the composite solid carbon dioxide, such for example, as water, under the surface of the body or bath of liquefied carbon dioxide to be solidified, such body of liquid carbon dioxide being at sufficiently low temperature to freeze the added ingredients or substances. By the formation and production of a composite solid carbon dioxide by such methods of my invention utilizing the aforesaid basic step, certain highly desirable results and valuable advantages are attained, among which may be enumerated the following:

First such methods permit the formation and production of structurally sound blocks of composite solid carbon dioxide having a uniform distribution and dispersion of the added ingredients or substances, such as water in the case of hydrated composite solid carbon dioxide, in one chamber, which may be of the solidification and pressing chamber of commercial solidification apparatus, so that the composite solid carbon dioxide is thus formed and pressed into high density blocks or cakes by what amounts to substantially a single step process in a single chamber without the necessity of removal and rehandling of the composite solid carbon dioxide at any intermediate stage of its manufacture.

Second, such methods remove the limitations on the amounts or percentages of the water or other ingredients or substances that may be added to the carbon dioxide when the added ingredients or substances must be dissolved in the liquid carbon dioxide, as is required by the methods of my above referred to U. S. Patent 2,020,189, so that composite solid carbon dioxide containing quantities amounting to two per cent (2%) or up to twenty per cent (20%) or even higher, of water-snow or other added ingredients or substances, may be produced.

Third, the mechanical difficulties which may be encountered by methods and apparatus such as disclosed by Josephson in the U. S. Patent 1,927,175 for introducing percentages of water in quantities amounting to over one per cent (1%) of the pure solid carbon dioxide, are eliminated or avoided by the use of the methods and apparatus of my invention.

Fourth, by injecting or discharging the added ingredients or substances in liquid form under the surface of a body of liquid carbon dioxide, in accordance with my methods, the droplets of injected liquid are fully frozen under the surface of the bath of liquid carbon dioxide and after being so frozen are separated by a film or mass of liquid or solid carbon dioxide, so that there is much less tendency to form localized aggregates of the added ingredients or substances, or for the added ingredients or substances to adhere to the walls of the chamber in which the body or bath of liquefied carbon dioxide is contained.

Fifth, the droplets of the added ingredients or substances are frozen of much more uniform shape and size, since while confined under the surface of the bath of liquefied carbon dioxide under pressure, the droplets remain approximately spherical while being frozen.

Sixth, the freezing of the added ingredients or substances is accomplished with maximum speed and efficiency, because the added ingredients or substances in finally divided form are in contact with the refrigerant (carbon dioxide) in its liquid phase, as contrasted for example, with a method such as that disclosed in the Josephson Patent 1,929,175 where the intimate contact is mostly between the finally divided added ingredient or substance and the refrigerant in the vapor phase, lacking the rapid and constant refrigerating effect of the liquid phase.

Seventh, the limitation of the nature of the ingredients or substances which may be added is removed and they need no longer be of such a character as to be soluble in liquid carbon dioxide, nor do they need to be of such consistency as to be capable of being utilized successfully in an apparatus such as that disclosed in the above mentioned Josephson U. S. Patent 1,927,175, so that, it becomes practical to add gummy, sticky or non-homogeneous ingredients, substances or materials in order to make compounds and products for various purposes.

Eighth, the return of portions of the added ingredients or substances, which may be troublesome and in the case of water can be of corrosive action, to the compressor suction is kept to an absolute minimum because the added ingredient or substance, such as water in the production of hydrated composite solid carbon dioxide, is injected or discharged only under the surface of a body or bath of liquefied carbon dioxide, so that corrosion in the condenser system of the liquefaction cycle, and plugging of those parts of the system which are at temperatures below the freezing point of the added ingredients or substances, is eliminated.

With the foregoing general features, characteristics, and results in view, as well as certain others which will be readily apparent from the following detailed explanation and description of the methods of my invention and of forms of apparatus for carrying out the same, my invention consists in certain novel method steps and sequences of steps, and in certain novel features in design and construction and in combinations of elements of apparatus, all of which will be more fully referred to and specified hereinafter.

Referring to the accompanying drawings in which similar reference characters refer to corresponding parts throughout the several figures thereof:

Fig. 1 is a more or less diagrammatic view, partly in side elevation, of a vertical single chamber type carbon dioxide solidifying and pressing apparatus, the single solidification and pressing chamber and lower platen thereof being shown in vertical section, and with the solidification and pressing chamber of such apparatus being shown provided with a nozzle and a supply system for discharging or injecting the ingredient or substance to be added to the carbon dioxide to form composite solid carbon dioxide therewith in accordance with a method of my present invention, a carbon dioxide liquefying system being schematically illustrated in operative association with the solidifying and pressing apparatus for supplying liquid carbon dioxide thereto.

Fig. 2 is a detailed vertical, longitudinal section through a form of injection nozzle of my invention, the nozzle being shown in mounted and installed position in a wall of the solidification chamber of the apparatus of Fig. 1.

Fig. 3 is a more or less diagrammatic view showing an arrangement of a plurality of injection or discharge nozzles mounted and installed in a carbon dioxide solidification and pressing chamber, such chamber being more or less diagrammatically shown in horizontal transverse section, and a modified system of my invention for supplying such nozzles with liquid under pressure being schematically illustrated in operative connection with the nozzles.

Fig. 4 is a more or less diagrammatic illustration of a modified arrangement of apparatus for carrying out certain methods of producing composite solid carbon dioxide in accordance with my invention, adapted for use with a method of carbon dioxide solidification in which a chamber is adapted to be charged with a mixture of liquid and solid carbon dioxide.

Fig. 5 is a vertical, longitudinal section through the liquid carbon dioxide discharge nozzle of the solidification apparatus of Fig. 4, modified for the injection thereinto of the ingredient or substance to be added to the carbon dioxide to form a composite solid carbon dioxide in accordance with certain methods of my invention.

In the following detailed description and explanation of composite solid carbon dioxide and of methods and apparatus for producing such composite carbon dioxide, embodying my present inventions, and in the appended claims defining and covering such inventions, I have used the term "impurity" or "impurities," in a broad generic sense to include any and all ingredients or substances which may be added to and admixed with carbon dioxide to produce composite solid carbon dioxide having the characteristics of the invention. Such impurities, for example, include water, oil, and various other substances and ingredients, and water or other liquid solutions of various substances and ingredients, specific examples of which will be identified and referred to and described hereinafter.

In accordance with one of the methods of my present invention for forming and producing composite solid carbon dioxide, the characteristic steps of such method reside in discharging or injecting the "impurity" or "impurities" under the surface of a body or bath of liquid carbon dioxide confined in a chamber in which the pressure is above the triple point of the carbon dioxide but which body or bath of liquid carbon dioxide is at a temperature below the freezing temperature of the impurity or impurities, while simultaneously atomizing or breaking up the impurity or impurities in order to obtain a very fine dispersion of small particles thereof through the body or bath of liquefied carbon dioxide. The result of this step is to form in effect an "emulsion" or "milk" of the bath or body of liquid carbon dioxide in the chamber prior to the solidification thereof in the chamber. This method of the invention based upon the foregoing steps, is particularly efficiently adapted to use with the generally practiced methods for the commercial solidification of solid carbon dioxide in which a body or bath of liquid carbon dioxide is formed and maintained in a single chamber of a solidification and pressing apparatus, and a portion of the body of liquid is solidified by permitting the body of liquid to boil off from its upper free surface at the triple point. The mass of solid carbon dioxide accumulated in the chamber is then mechanically pressed into a block or cake of high density solid carbon dioxide in the chamber in which the mass has been formed.

Figure 1:
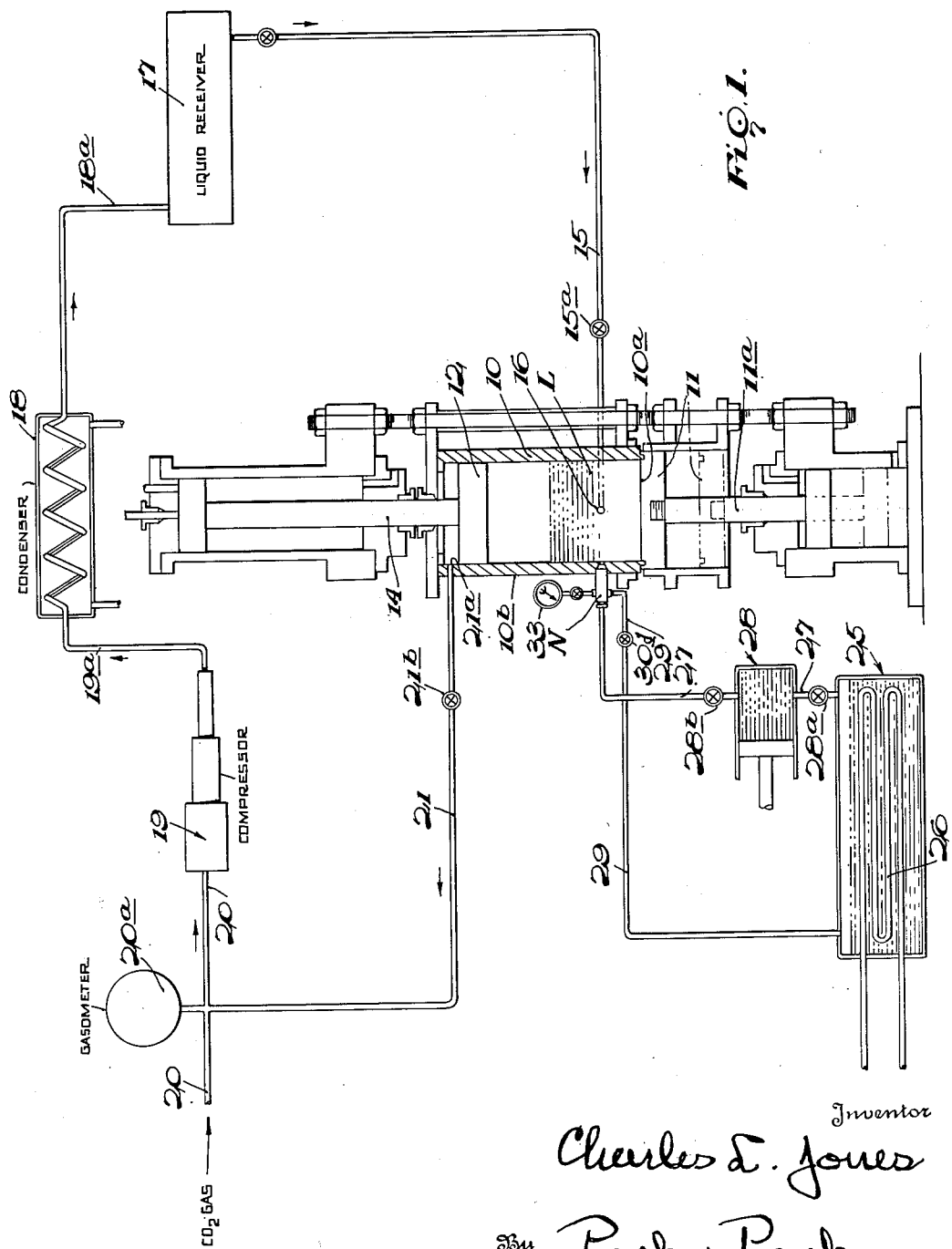

As an example of an adaptation and application of such methods, and of certain of the apparatus of my present invention, to the formation and production of composite solid carbon dioxide with such generally employed methods and apparatus for the commercial production of blocks or cakes of solid carbon dioxide, I have illustrated, more or less diagrammatically in Fig. 1 of the accompanying drawings a system for the liquefaction of carbon dioxide and solidification and pressing of solid carbon dioxide produced from such liquid, which system includes a type of carbon dioxide solidification and pressing apparatus that is at present practically universally used in the commercial solidification of carbon dioxide in the United States.

Such a system is schematically or diagrammatically represented in Fig. 1 of the drawings, as including a vertical type solidification and pressing apparatus, such as that disclosed in Fig. 5 of the U. S. patent to Cole and McLaren No. 2,025,698, dated December 24, 1935. Such an apparatus embodies a vertically disposed solidification and pressing chamber 10 having an open lower end 10a adapted to be opened and closed by a horizontally disposed closure head or platen 11 which is mounted for bodily movement vertically to and from chamber closing and opening positions by means of a pressure fluid actuated rod or plunger 11a. The upper end of the chamber 10 is suitably closed and a vertically reciprocal pressing plunger 12 is mounted in the chamber and is actuated by a fluid pressure operated rod 14. The pressing plunger 12 is usually formed of a diameter or width less than the internal width or diameter of the chamber 10, so as to have a loose fit in the chamber in order that carbon dioxide gas may flow or pass upwardly between the plunger and the adjacent side walls of the chamber 10 into the upper end portion of the chamber. The closure head or platen 11 is disclosed in full lines in Fig. 1 in its raised position closing the chamber 10 for holding a body of liquid carbon dioxide L therein for solidification. The closure head or platen 11 is illustrated by dotted lines in Fig. 1, in its lowered chamber opening and block discharging position. Pressing plunger 12 is shown in Fig. 1 in its normally raised and inactive position at the upper end of the chamber 10, with the body or bath L of liquid carbon dioxide contained in the chamber between the platen or closure head 11 and the raised plunger 12, preparatory to the solidification of a portion of the body of liquid carbon dioxide in the chamber 10 by self evaporative cooling methods familiar in the art.

The solidification and pressing chamber 10 is supplied with liquid carbon dioxide through a supply line 15 having a control valve 15a therein. The line 15 extends and supplies liquid carbon dioxide to a suitable discharge port of nozzle 16 which discharges into the chamber 10 through a side wall thereof. The port or nozzle 16 is located, in this instance in the lower end portion of a wall of the chamber 10 spaced a distance above the lower discharge end 10a of the chamber. It will be understood, of course, that in actual practice a plurality of liquid discharge ports or nozzles are frequently employed and the location thereof in the wall or walls of the solidification chamber will vary in accordance with the conditions and requirements of each particular installation. It should be pointed out at this point, however, that in so far as my present inventions are concerned it is not considered that the particular location of the liquid supply ports or nozzles in the solidification chamber is essentially critical. The liquid carbon dioxide supply line 15 receives liquid carbon dioxide under pressure from the liquid receiver 17, which liquid receiver is supplied with liquefied carbon dioxide under pressure through a line 18a leading from a condenser 18, of the liquefaction system. The system is supplied with carbon dioxide gas from any suitable source by means of a gas supply line 20, with which may be associated the usual or any desired gasometer 20a. The supply line 20 leads to and discharges into the intake of the low pressure stage of a multi-stage compressor 19 in which the gas is compressed in the usual manner to the required pressure for liquefaction in the particular system. The carbon dioxide gas is usually compressed by the compressor 19 to a pressure of the order of one thousand pounds (1000 lbs.) per square inch, and is delivered by a suitable pipe line 19a to the condenser 18 in which the compressed gas is liquefied by removing the heat of compression therefrom to reduce the temperature of the gas to a temperature at which the gas will liquefy at the pressure of the gas in the condenser. It is to be understood, of course, that the liquefaction system schematically shown in Fig. 1, and above generally described, is representative of any system of cycle for the liquefaction of carbon dioxide gas to produce a supply of liquefied carbon dioxide for solidification.

The evaporation gases formed in the solidification and pressing chamber 10 during formation of solid carbon dioxide therein from the body of liquid carbon dioxide in the chamber 10 and from the pressing of the mass of solid carbon dioxide in such chamber, are, in the example of the system here schematically represented, returned to the low pressure carbon dioxide gas supply line 20 and returned with the gas from the main supply source to the compressor for recompression and recycling. For example, such a return gas line 21 for the evaporation gases is illustrated in Fig. 1, as connected between a discharge port or outlet 21a in the upper part of the chamber 10 above the pressing plunger 12 therein, and the low pressure gas supply line 20 which supplies gas to the compressor 19. A suitable control valve 21b is provided in the line 21 for throttling the line 21 to control the flow of evaporation gas therethrough from the chamber 10 and to thereby control and determine the back-pressure maintained in chamber 10, and the rate of evaporation and boil-off.

Figure 3:
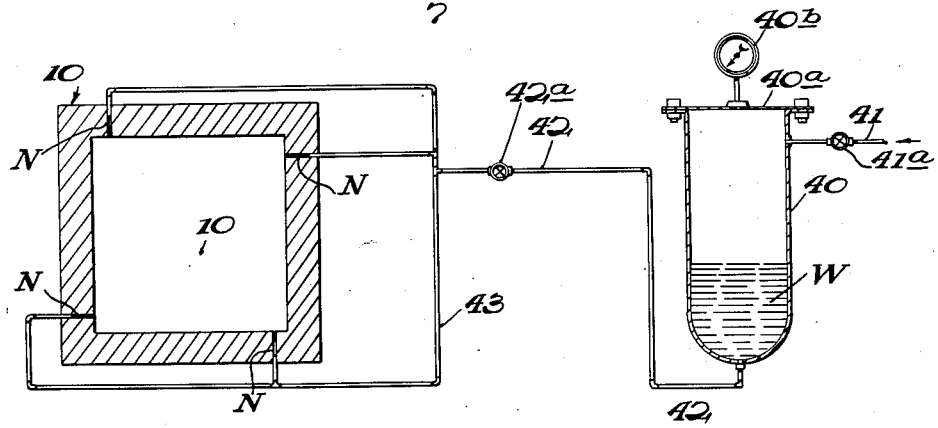

The particular solidification and pressing apparatus diagrammatically illustrated in the example of Fig. 1, is for purposes of explanation to be considered as of the generally used commercial size of such apparatus in which the solidification and pressing chamber 10 is of twenty inch by twenty inch (20" x 20") square cross section, and of a vertical heighth or depth such as to permit the production of a completed high density block or cake of solid carbon dioxide 10" thick and of a weight of the order of two hundred ten pounds (210 lbs.). The square cross section of the chamber 10 is indicated in Fig. 3 of the drawings, to which detailed reference will be had hereinafter. The pressing plunger 12 in such commercial presses is usually actuated by fluid pressure of the order of two thousand pounds (2000 lbs.) per square inch.

In carrying out the production of composite solid carbon dioxide with the solidification and pressing apparatus of Fig. 1, in accordance with the steps of the particular method of my invention now being described, I provide a suitable liquid atomizing and spraying nozzle N for atomizing and spraying the impurities into the body or bath of liquid carbon dioxide L which is formed in the chamber 10 of the solidification and pressing apparatus preparatory to the solidification of a portion of the body of liquid carbon dioxide in the chamber 10. I mount and install the nozzle N in and extending through a side wall 10b spaced a distance above the lower discharge end 10a of the chamber, as will be clear by reference to Fig. 1 of the drawings. This nozzle N may be any suitable type of liquid atomizing and spraying nozzle such for example as an atomizing nozzle of the type used for the injection of fluid in Diesel engines, although in the particular example hereof I have illustrated a form and design of nozzle of my invention particularly adapted for the purpose of carrying out steps of my method. The nozzle N is supplied with the desired impurity or impurities in liquid or fluid form, such as water, oil or water or other liquid solutions of the impurity or impurities to be added to the carbon dioxide to form the desired composite solid carbon dioxide of the invention. The impurity is adapted to be injected into the body or bath of liquid carbon dioxide L in the chamber 10 by imposing a pressure therein through the medium of any suitable means such as a pump or by means of superimposed carbon dioxide or air pressure on the liquid impurity being supplied to the nozzle. I have found that the higher the pressure on the liquid or fluid impurity, the more positive is the injection and the finer the degree of atomization thereof, as well as the more effective the dispersion of the particles of impurity in and through the body or bath of liquefied carbon dioxide.

For example, in Fig. 1, I have illustrated more or less schematically, a system for supplying fluid or liquid impurity under pressure to the atomizing injection nozzle N in the chamber 10 of the solidification and pressing apparatus. This system includes a storage tank or container 25 for containing a supply of the fluid or liquid impurity or impurities to be injected into the chamber 10 through the nozzle N, such tank being provided, if desired, with suitable heating coils 26 for controlling and determining the temperature of the body of fluid or liquid impurity stored in the tank 25. A supply line 27 extends from the tank 25 to the nozzle N and a suitable pressure pump 28, say of the reciprocating plunger type, is interposed and coupled into the line 27 in order to pump and force liquid impurity from the tank 25 under pressure into and through the atomizing injection nozzle N. Suitable control valves 28a and 28b are provided in the supply line 27 at the intake side and the discharge side, respectively, of the pump 28. In the instant example, a return flow line 29 is provided extending from the nozzle N back to and discharging into the tank 25 for returning liquid impurity from the nozzle end to the tank, and completing a substantially closed circuit with the tank 25. A control valve 30d, is provided in the return flow line 29 for a purpose to be described and explained hereinafter.

While the nozzle N may be of any suitable type for atomizing and spraying liquids, I have devised a design and construction of atomizing injection nozzle for carrying out the injecting and atomizing steps of the method of my invention, which form of nozzle I now consider to be preferable from the standpoint of efficiency of performance. This nozzle N of my invention, referring now to Fig. 2 of the drawings in particular, embodies the barrel or body 30 of generally tubular form having a tapered or frustroconical inner discharge end 31, providing an annular seating shoulder 31a and an end closure wall 31b of reduced diameter through which the nozzle opening or orifice 31c is formed extending axially therethrough. The nozzle discharge opening or orifice 31c, is in the specific example of nozzle N here shown, of a diameter of approximately .020" and is drilled straight through the end wall 31b, which end wall is preferably of a thickness of approximately ⅛". However, it is here pointed out that the atomizing nozzle discharge opening or orifice 31c may, if desired or found expedient, be tapered, and such orifice may be varied in diameter in accordance with the character of discharge and delivery desired from the nozzle.

The nozzle body or barrel 30 is provided at its upper side when in mounted and installed position, with a suitable tapped bore 30a in which is threaded a suitable connection 32 connected with and carrying a pressure gauge 33 at the upper end thereof, a valve 32a being provided in the connection 32. The outer end of the nozzle barrel 30 is internally threaded and an externally threaded bushing 33 is screwed thereinto to close and form a liquid and pressure type seal for the outer end of the nozzle barrel. The bushing 33 is formed with an axial bore 33a therethrough and an inlet tube 34 is mounted in and extending through the bore 33a in bushing 33, being mounted and confined therein to form a liquid and pressure tight engagement with the wall of the bushing surrounding the bore 33a. This inlet tube 34 extends inwardly and axially through the nozzle barrel 30 to the inner discharge end of the barrel with the inner discharge end 34a of the tube 34 spaced inwardly from the end wall 31b of the nozzle and lying substantially at the base of the tapered end of the nozzle barrel, as will be clear by reference to Fig. 2. The inlet tube 34 has an external diameter considerably less than the internal diameter of the nozzle barrel, so that, an annular chamber 35 is formed around the tube 34 between the inner wall of the barrel 30 and the outer wall of said tube 34. A suitable fluid outlet connection 36 is threaded into a tapped bore at the outer end of the barrel 30 adjacent bushing 33 and opening into the annular chamber 35 for flow of fluid outwardly therethrough from the nozzle barrel, the connection 36 in this instance being located substantially opposite the connection 30a for the gauge 33. The outer end of the inlet tube 34 is adapted to be connected to the liquid impurity supply line 27, and the outlet connection 36 is adapted to have connected thereto the return flow line 29 of a fluid or liquid impurity supply system, for example, such as the supply system schematically illustrated in Fig. 1 of the drawings, and hereinbefore described.

A nozzle N designed and constructed as above described, is preferably mounted and installed in a wall 10b of the chamber 10 in generally horizontally disposed position in a bore or opening 37 formed through the wall 10b, and having an inwardly tapered, reduced diameter inner end 37a terminating in the reduced diameter discharge opening 37b into the chamber 10 at the inner end of the bore 37. The bore 37 has an internal diameter greater than the external diameter of the nozzle barrel 30, so as to form an annular space around the barrel between the outer wall thereof and the inner wall forming the bore 37. The inner tapered and reduced diameter end 37a of the bore 37 provides a seat for receiving the tapered, frustro-conical inner end of the nozzle barrel 30, and in mounted and installed position of the nozzle N, a suitable pressure tight gasket 38 is interposed between the seat 37a and the tapered wall 31a of the reduced diameter end 31 of the barrel 30. The nozzle N is securely held in mounted and installed position by a suitable clamp means (not shown) with the inner end of the barrel end forced and held tightly against the sealing gasket 38 and with the atomizing discharge opening or orifice 31c discharging into and axially aligned with the opening 37b through the chamber wall 10b into the chamber 10. If desired, the space 37 around the nozzle barrel 30 in the chamber wall 10b can be packed with insulating material or provided with a suitable insulating sleeve, but as in the example hereof, when this opening is left unfilled it will be automatically filled with ice from condensed atmospheric moisture during the operation of the solidification apparatus, which ice packing will serve the same purpose as permanent insulating material in insulating the nozzle body from the chamber wall 10b of the chamber 10.

Figure 2:
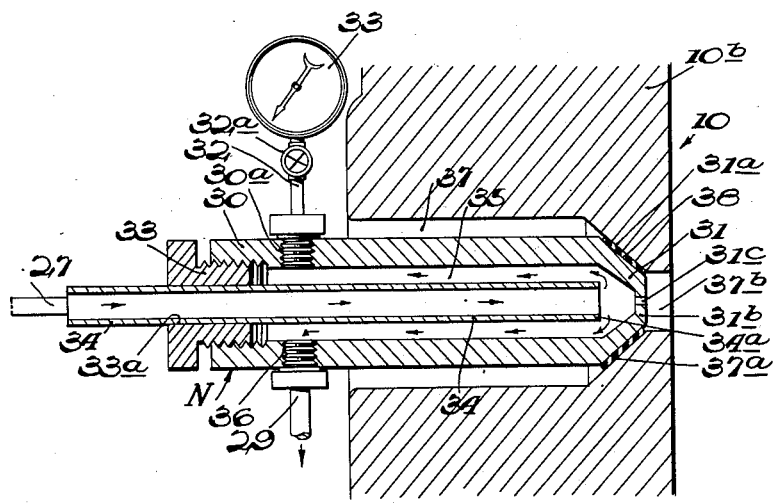

With a nozzle N mounted and installed in a wall 10b of the solidification and pressing chamber 10, as disclosed in Figs. 1 and 2 of the drawings, and the nozzle N connected and coupled into the fluid or liquid impurity supply system of Fig. 1, the liquid supply line 27 is connected to the liquid supply tube 34 of the nozzle end, and the liquid return line 29 is connected to the discharge connection 36 from the chamber 35 of the nozzle N. The pump 28 of the supply system maintains the fluid or liquid in the system circulating under pressure from the tank 25 through line 27 into the nozzle tube 34. If the atomizing discharge opening or orifice 31c of the nozzle N is closed and if the valve 30d in the return flow line is open, the fluid impurity flows from the inner end of tube 34 into the chamber 35 toward the outer end of the nozzle and then outwardly from the chamber 35 through outlet connection 36 and back into the tank 25 through the return flow line 29, as indicated by the arrows in Fig. 2. Thus, a continuous circulation of fluid under nominal pressure, is maintained from the tank 25 through the nozzle N and back to the tank by the pump 28. The nozzle orifice 31c under normal operating conditions is effectively plugged and closed by the freezing of a small quantity of the fluid or liquid impurity in the orifice 31c, due to the intense cold or extreme low temperatures to which the nozzle N is reduced by the solidification operations in the chamber 10. This effective closing of the nozzle orifice 31c by such an ice plug, results in the continuous circulation of fluid at nominal pressure through the system as above described. Preferably, as hereinbefore pointed out, the fluid or liquid impurity is warmed or heated in the tank 25 by the heating coils 26 to a temperature such as to maintain the nozzle body at sufficiently high temperature by the circulation of such warm fluid therethrough, to prevent any freezing of fluid or liquid therein, except in the immediate vicinity of and in the nozzle discharge orifice 31c. In other words, a fluid or liquid impurity is preferably maintained at the lowest definite temperature which will be high enough to maintain continued operation without freezing up the nozzle against supply of fluid or liquid impurity to and circulation thereof through the nozzle N.

When it is desired to inject fluid impurity from the nozzle N through the discharge orifice 31c thereof and the opening 37b into the chamber 10, the control valve 30 in the fluid return flow line of the system is closed or sufficiently throttled to cause the pressure in the nozzle to build up to any desired value as indicated on the pressure gauge 33 of the nozzle, say, for example, to a pressure of one thousand (1000) or even two thousand (2000) pounds per square inch, which pressures will in normal operation be sufficient to blow the small plug of ice which will have been frozen in the discharge orifice 31c of the nozzle, from such orifice and thus clear the same for atomizing injection of any required quantity of impurity into the chamber 10 of the solidification and pressing apparatus. When it is desired to stop atomizing injection of fluid impurity from the nozzle N into the chamber 10, the valve 30 may be fully opened with the subsequent reduction in pressure to the normal nominal fluid circulating pressure for the system, whereupon, the intense cold at the inner end of the nozzle will freeze fluid in the nozzle orifice 31c and again effectively plug the same until broken clear by again increasing the pressure to a sufficient value to blow the ice plug from the nozzle orifice.

In Fig. 3 of the drawings, I have more or less diagrammatically illustrated an alternative type of system of supplying and forcing the fluid or liquid impurities into the body or bath of liquefied carbon dioxide in the solidification chamber, to that disclosed in Fig. 1 and hereinbefore described. In the system of Fig. 3 a tank or reservoir 40 is provided in the form of a closed pressure vessel adapted to be periodically charged with impurity, such pressure vessel preferably being of the type of vessel employed as a carbon dioxide "liquefier" or "converter" widely used in the trade for converting solid carbon dioxide to liquefied carbon dioxide. Such vessel 40 is provided with a removable sealing closure 40a and is preferably provided with a suitable pressure gauge 40b. In the example of Fig. 3, a pipe line 41 having a control valve 41a therein discharges high pressure carbon dioxide into the upper portion of the chamber 40 above the upper free surface of a body of fluid or liquid impurity W contained in the vessel 40, the line 41 being preferably connected with and receiving carbon dioxide from the condenser system of a liquefaction plant or system, such as the system schematically illustrated in Fig. 1, at pressures of one thousand (1000) to two thousand pounds (2000 lbs.) per square inch. In this manner the fluid or liquid W in the vessel 40 is placed under pressure and may also be carbonated by the carbon dioxide in order to promote better dispersion thereof when the carbonated impurity is atomized and injected by a suitable nozzle such as the nozzle N. The carbonated fluid or liquid impurity W is forced under pressure from the lower end of the vessel 40 through a discharge line 42 having a control valve 42a therein. The line 42 may be connected into a single nozzle N such as disclosed in Fig. 1, or may be connected and discharged into a manifold line 43, as in the example of Fig. 3 for supplying a plurality of injection nozzles N with fluid impurity under pressure. It is to be understood that instead of supplying vessel 40 with high pressure carbon dioxide, such vessel may be supplied through a suitable line such as 41, with air under pressure to place and maintain the fluid W under pressure in the vessel 40.

In the arrangement diagrammatically illustrated in Fig. 3, four impurity injection nozzles N, or any other suitable type of nozzle, are mounted and installed in the side walls 10b of the solidification and pressing chamber 10. In the arrangement of nozzles N as shown in Fig. 3, each nozzle is mounted and located in the chamber walls to discharge tangentially into each corner of the solidification chamber 10, so as to promote circulation of the liquid charge in the chamber. While the nozzles are generally indicated in the diagrammatic disclosure of the arrangement thereof in Fig. 3, as being horizontally disposed, each of the nozzles N, or any one or more thereof, may be mounted in downwardly inclined positions to direct the discharge therefrom downwardly in order to prevent settling of impurities into the corners of the block or cake of composite solid carbon dioxide formed in the chamber 10. The necessity for a plurality or multiplicity of nozzles N such as shown in Fig. 3, will be determined by the character of the impurities to be injected into the chamber, the quantities of such impurities to be so injected and the rate of production. Thus, for example, in those operations in which only a relatively small percentage of impurities is added to the carbon dioxide, one injection nozzle may suffice. However, in those operations in which larger amounts of impurities are added, a multiplicity of nozzles will generally be found desirable. In those operations carried on at relatively high rates of production the nozzle arrangement shown in Fig. 3 will tend to cause excessive swirling of the charge and to tend to throw the material into the corners of the solidification chamber 10, so that, under such conditions opposed nozzle arrangements or a larger number of nozzles may be desirable. In connection with the location of a nozzle or nozzles and the relative arrangements thereof, it is well to bear in mind that the action which takes place when the fluid or liquid impurity is atomized and injected in the body or bath of liquefied carbon dioxide, is much the same as though molten lead were sprayed under the surface of water, resulting in what may be likened to an explosive evolution of steam. This effect must be regulated and controlled in order to prevent excessive entrainment of liquid carbon dioxide.

In the usual method practiced in solidifying and pressing carbon dioxide with the solidification and pressing apparatus and the associated carbon dioxide liquefaction system schematically illustrated in Fig. 1 of the drawings, the solidification and pressing chamber 10 is first closed by the closure head or lower platen 11, the pressing plunger 12 being in its raised inactive position, all as shown in Fig. 1 and liquid carbon dioxide is then discharged and admitted into the closed chamber 10 through the liquid inlet or nozzle 16 by opening the valve 15a. During liquid admission the return line 21 for the evaporation gases may be suitably throttled by the valve 21b, so that, the pressure in chamber 10 will build up to above the triple point pressure for the carbon dioxide, in order to maintain the liquid carbon dioxide discharged into the chamber as a liquid. When the required body of liquid L is built up or formed in chamber 10 the discharge of liquid into the chamber 10 may be shut off by closing valve 15a, so that the pressure within the chamber by continued withdrawal of evaporation gases therefrom through line 21, will drop to the triple point pressure of the carbon dioxide. The body of liquid carbon dioxide will then boil-off or evaporate from its upper free surface until a portion thereof has been solidified and the remainder converted to carbon dioxide gas. Upon completion of the boiling-off at the triple point by conversion of all of the liquid carbon dioxide to solid and to gas, the pressure in chamber 10 is permitted to fall to substantially atmospheric pressure, after which the mass of solid carbon dioxide is then pressed into a dense block by a downward pressing stroke of the pressing plunger 12, the block after completion being removed from the chamber by lowering platen 11 to the dotted line position of Fig. 1.

In the production of composite solid carbon dioxide, in accordance with the method of my invention as hereinbefore described, with the apparatus and system of Fig. 1, the fluid or liquid impurity is atomized and injected into the body or bath of liquid carbon dioxide L in the chamber 10 before the solidification of a portion of such body of liquid carbon dioxide by the self evaporation cooling method generally described above. Such atomization and injection is carried out by discharging the impurity under pressure through the atomizing nozzle N, or any other suitable nozzle or fluid impurity discharge means. The liquid impurity admission or injection valve N may be opened if desired at the same time as the valve 15a in the liquid carbon dioxide line 15 is opened to admit liquid carbon dioxide into the chamber 10, although in the preferred method the admission or injection of the fluid impurity into the chamber 10 is commenced or started a period of time after the start of admission of the liquid carbon dioxide into the chamber, in order that there will be some accumulation of liquid carbon dioxide in the chamber to form a refrigerant bath therein into which the fluid impurity may be injected. Also in the preferred method the admission or injection of the fluid impurity into the bath of liquid carbon dioxide in the solidification chamber is not cut-off or stopped for a period of time after the supply of liquid carbon dioxide to the chamber has been stopped. It will be understood, however, that the method of my invention is not limited or restricted to commencing and to stopping admission or injection of fluid or impurity into the solidification chamber in the aforesaid relation to the starting and to the shutting-off of the admission of liquid carbon dioxide to the solidification chamber.

In one example for purposes of illustration only, of an application of my method for producing composite solid carbon dioxide with the commercial solidificaton system and apparatus of Fig. 1, liquid carbon dioxide is supplied and fed to the solidification chamber 10 for a period of two (2) minutes, with the liquid carbon dioxide at a temperature of —50° F. and with the solidification chamber 10 maintained at a pressure of approximately 70 to 90 pounds per square inch gauge pressure. A liquid carbon dioxide supply inlet 16 is employed which will be of a proper size to pass and admit into the chamber 10 in two (2) minutes a sufficient quantity of liquid carbon dioxide to form a pressed block 20" x 20" x 10" weighing approximately 210 pounds. After this two (2) minute period the admission of liquid carbon dioxide to the chamber 10 is shut off and the body or bath of liquid carbon dioxide L in the chamber 10 is then permitted to boil-off for a period of five (5) minutes, with the pressure in the chamber during such boil-off period about 60 pounds gauge pressure. Upon the completion of the boil-off period, the solidification chamber 10 is then "blown down" to, or almost to, atmospheric pressure. In this particular solidification cycle according to the method of my invention, and taking as an example an impurity consisting of water, or of five to ten per cent (5 to 10%) water-methanol or water-ethanol solution, such impurity is injected at room temperature and at a pressure of approximately 1000 pounds per square inch through a suitable atomizing injection nozzle N, which nozzle will deliver approximately one (1) quart of fluid per minute in finely atomized or divided form under the surface of the body or bath of liquid carbon dioxide L in the chamber 10. If desired, the injection of fluid into the body of liquid carbon dioxide L in the chamber 10 can be started and stopped simultaneously with the starting of the admission of liquid carbon dioxide into the chamber and the shutting off of the admission of liquid carbon dioxide into the chamber, in which event, in the example here given, fluid impurity would be injected for a period of two (2) minutes at one (1) quart per minute which would amount to approximately four (4) pounds or two per cent (2%) impurity being added to the liquid carbon dioxide to form therewith the composite carbon dioxide.

In another example of an adaptation of the method of my invention to the system and apparatus of Fig. 1, the injection nozzle N will be of a size to deliver approximately one (1) pint of fluid impurity per minute under the surface and into the body or bath of liquid carbon dioxide L, but in this instance the injection of fluid impurity would commence one-half (½) minute after the start of the admission of liquid carbon dioxide into the chamber 10: In such instance, in order to obtain the same percentage of impurity as in the example given above, it would be necessary to inject the fluid impurity for a period of four (4) minutes which would thus prolong impurity injection for a period of about two and one-half (2½) minutes after the admission of liquid carbon dioxide to the chamber had been cut off or stopped, thus resulting in the continued injection of fluid impurity during approximately the first half of the five (5) minute period of boiling-off the body of liquid carbon dioxide in the chamber 10.

After completion of the solidification of the body of liquid carbon dioxide L with the desired quantities and character of fluid impurity dispersed therethrough in finely divided ice crystal form, the resultant mass of composite solid carbon dioxide of my invention is then mechanically pressed by utilizing the plunger 12 of the solidification and pressing apparatus in the chamber 10 thereof to compress the mass into finished, high density block form.

In connection with the above specific examples, it is to be understood that I do not desire to limit my invention to such specific injection pressures and temperatures, as I may employ any injection temperature and pressure and utilize any desired nozzle arrangement adequate to discharge the impurity into the solidification chamber efficiently and in finely divided form, and I may employ any time schedule, as long as there is no interference with the proper formation of the finished block of composite solid carbon dioxide.

The impurities to be injected into and under the surface of the body of liquid carbon dioxide have a freezing point higher than the temperature of the liquid carbon dioxide into which the impurities are injected, and because the impurity is injected in atomized and finely divided form, the freezing of the fine or small particles of the impurity will take place with extreme rapidity upon contact thereof with the liquid carbon dioxide, so that, such fine particles of the frozen impurity will be uniformly dispersed throughout the body of liquid in suspension therein prior to the solidification of the liquefied carbon dioxide. The quantity of the impurity which may be so injected into a body of liquid carbon dioxide to form very fine frozen particles of the impurity suspended in the liquid carbon dioxide is not dependent upon the solubility of the impurity in the liquid carbon dioxide, hence composite solid carbon dioxides having substantial percentages of various impurities may be practically produced by the methods of my present invention. As a specific example, hydrated composite solid carbon dioxides having substantial percentages of water or water solutions as the added impurities, can be produced of a sound structural character with a minimum tendency toward fracturing and which hydrated composite solid carbon dioxides will, upon evaporation, due to the large percentage of water-ice crystals uniformly dispersed therethrough and therein, automatically form a skeletally continuous and structurally strong insulating blanket of water-ice crystals completely around and enclosing the evaporating block or mass of such composite solid carbon dioxide. Such "blanket" will be of such proportions and strength as to form and maintain itself by evaporation of the block of composite solid carbon dioxide, even at the underside or surface of the block upon which the block may be rested and supported.

As hereinbefore pointed out, the methods of composite solid carbon dioxide production of this invention, substantially reduce the limitations on the nature of the impurities which may be added to the carbon dioxide in order to form a desired character of composite solid carbon dioxide, such limitations being removed in so far as the necessity for solubility in liquid carbon dioxide and consistency of the impurities are concerned. An essential limitation of the impurity, however, is that the impurity should have a freezing point higher than the temperature of the liquid carbon dioxide into which the impurity is injected.

For example, the methods of my invention make is possible to produce composite solid carbon dioxides embodying compounds and products for various purposes, such as, fumigation of soils and commodities, the transportation of dangerous or toxic materials, such as poison gases for use in warfare, as well as reactive mixtures for organic synthesis in which the reactant and the cooling agent are mixed to keep down the reactive temperature. As an example of this latter use, composite blocks of carbon dioxide and vegetable oils may be made in such a way that the composite block is placed directly in the sulfonating acid, resulting in sulfonation at an automatically controlled low temperature. Similarly other organic composites may be made for other low temperature reactions than sulfonation, and with other reactants than vegetable oils.

The methods of forming and producing composite solid carbon dioxide of my present invention, may also be adapted to and practiced with methods of solidification of carbon dioxide such as disclosed in the U. S. patent to Rufener and Eichman No. 1,818,816 dated August 11, 1931, to which reference may be had for a detailed explanation of such solidification methods. However, for purposes of describing the practicing of various adaptations of my methods of producing composite solid carbon dioxide with the solidification method of the above referred to U. S. Patent No. 1,818,816, I have more or less schematically illustrated in Fig. 4 of the drawings, a system for the liquefaction of carbon dioxide in operative association with apparatus for solidifying carbon dioxide in accordance with the aforesaid U. S. patent. In the system of Fig. 4, a so-called "generator" or solidification vessel G is provided which has a nozzle 50 mounted in vertically disposed position in the upper closed end wall 51 of the vessel G. This nozzle 50 is supplied with liquid carbon dioxide from a liquid receiver 17' through a liquid carbon dioxide supply line 52 having a control valve 52a therein. The receiver 17' receives liquefied carbon dioxide from condensers 53 and 54. The condenser 53 receives compressed carbon dioxide gas from the compressor 19' in which low pressure carbon dioxide gas received from a gasometer 55 is compressed by several stages of compression to the required pressure for liquefaction in the condenser. The gasometer 55 is supplied with low pressure gas from a suitable source by supply line 20'.

The vessel G has an evaporation gas return line 56 which opens into the upper end of vessel G and extends and discharges into settling tanks 57 and 58 by valve controlled branch lines 57a and 58a, line 57a having a valve 57b therein and line 58a having a valve 58b therein. A gas line 59 receives gas from the settling tanks 57 and 58 through valves 57c and 58c respectively. The gas line 59 extends to and is connected with the intake at the low pressure side of a two stage compressor 60, line 59 being provided with a valve 60b therein adjacent compressor 60. The compressor 60 compresses the gas supplied thereto to a desired pressure for liquefaction and the compressed gas is fed by line 61 to the condenser 54 in which it is liquefied. The liquefied carbon dioxide from compressor 60 is supplied to the liquid receiver 17' for return to the solidification vessel or generator G by line 52.

The lower end of the solidification vessel G is provided with a removable closure head 62 and a screen or porous plate 62a is provided spaced above the end wall of the head 62 within the vessel G to provide a supporting surface for a carbon dioxide mass to be solidified in the vessel. An evaporation gas line 63 is in communication through the lower head 62 with the interior of the vessel G beneath the screen or plate 62a for withdrawing gases from the vessel below the mass of carbon dioxide in the vessel on the plate 62a. The evaporation gas line 63 extends to and joins into the gas line 59 between the valve 59a and the valve 60b in the line 59. The gas line 63 is provided with a valve 63a therein between the removable closure head 62 and the connection of the line 63 into the gas line 59. A gas line 63A is connected into line 59 between the valve 60b and the connection of line 63 into the line 59, and the line 63A extends and is connected into the gas supply line 20' for returning gas at low pressure from the lower end of vessel G to the supply line 20' for recompression and reliquefaction.

The nozzle 50 of the solidification apparatus of Fig. 4, which nozzle is mounted at and discharges into the upper end portion of vessel G, is disclosed more or less diagrammatically in longitudinal vertical cross-section in Fig. 5 of the drawings, and includes an axial bore therethrough which comprises an expanded or enlarged diameter section forming an expansion chamber 50a, and a section in communication therewith and of constantly increasing internal diameter to form a diffusion chamber 50b which terminates at the lower end of the nozzle in an enlarged diameter discharge opening 50c.

In the method of solidification commercially practiced with the solidification apparatus of Fig. 4, a body or mass of moist carbon dioxide in the form of a "slush" S is built up in the vessel G by discharging and expanding liquid carbon dioxide through the nozzle 50 with the pressure in the vessel G maintained at approximately the triple point pressure of carbon dioxide. The expansion of the liquid carbon dioxide through the nozzle 50 results in the injection of a mixture of particles of solidified carbon dioxide together with particles of liquid carbon dioxide together with the formation of carbon dioxide gas in the solidification vessel G. During the building up of the mass of moist or "slush" carbon dioxide in the vessel G, the valve 63a in the evaporation gas line 63 from the lower end of the vessel G is closed, while the gas line 56 from the upper end of the vessel is open and evaporation gases are drawn from the upper end of the vessel through line 56 and either the settling tank 57 or the settling tank 58, and then through lines 59 and valve 60b into the compressor 60. During the foregoing operation the gas line 63A is closed off by the valve 63B. This gas withdrawal is at such a rate in relation to the input of liquid carbon dioxide through nozzle 50, that approximately triple point pressure is maintained in the vessel and the evaporation gases withdrawn from the vessel are at substantially the triple point pressure of the carbon dioxide, that is, approximately 60 pounds per square inch gauge pressure. These gases are recompressed in compressor 60, liquefied in condenser 54 and returned to the liquid receiver 17'. During this operation valve 59a in the line 59 is open. After the desired quantity of carbon dioxide "slush" S is accumulated in the vessel G, valve 59a in line 59 is closed, valve 60b in line 60a is closed, while valve 63a in line 63 and valve 63B in line 63A are each open, which results in placing the lower end of the vessel G below the mass of "slush" S therein, in communication with the low pressure stage of the compressor 19' so that such compressor will reduce the pressure in the vessel G causing diffusion of gas downwardly through the mass S as the mass solidifies by further expansion of the portions of liquid carbon dioxide therein, thus resulting in the production of a relatively dense cake of solid carbon dioxide, which may then be removed from the vessel through the lower end thereof by removing the lower end closure head 62.

In adapting the apparatus and system of Fig. 4 of the drawings, and the method of carbon dioxide solidification carried out therewith, to the methods of composite solid carbon dioxide production of this invention, I provide a suitable system for supplying fluid impurities under pressure to the vessel G, having selected in this instance a system similar to the system disclosed and described hereinbefore in Fig. 3 of the drawings. Such impurity supply system includes the pressure vessel 40 and the fluid impurity supply line 42 extending from the lower end of that vessel. Such supply line 42 in this example, leads to the upper end of the solidification vessel G and discharges through the closed upper end thereof, the flow of fluid through line 42 being controlled by a valve 42a. A discharge port 51a is formed through the upper end closing wall 51 of the vessel G, and the line 42 is connected to and discharges through such port into the upper end portion of the solidification chamber formed by vessel G. As an alternative means of supplying fluid impurity to the vessel G, a fluid impurity supply line 65 having a control valve 65a therein is connected into the fluid impurity supply line 42, and extends therefrom to a nozzle connection 66 attached in a side wall of the nozzle 50, referring now to Fig. 5 of the drawings, in a position to discharge fluid impurity into the expansion chamber 50a of the nozzle 50.

My invention provides several methods for producing composite solid carbon dioxide with that method of carbon dioxide solidification and block forming as practiced with the system and apparatus of Fig. 4, which methods of my invention may be generally classified as, (1) "successive," (2) "simultaneous," and (3) "intermittent."

Methods of the "successive" class are identified by the fact that the water or other impurity snow or impurity lattice of impurity snow, is always deposited first, and then the solid carbon dioxide is later formed and deposited with such impurity snow to form the composite solid carbon dioxide. In the primary and simplest type of "successive" method, a block of frozen impurity in snow form, such for example as water snow, is formed of an approximate size and shape of the solidification chamber provided by the vessel G. Such impurity snow block is preferably formed exteriorly of the vessel G and after completion is placed in the vessel G, moist carbon dioxide or carbon dioxide "slush" is then deposited in the interstices of the snow block in the vessel G, by the methods of "slush" formation hereinbefore described, and the solidification of the mass of moist or "slush" carbon dioxide is then completed to form a homogeneous, structurally strong composite block in the vessel G with the mass or block of impurity snow therein.

In accordance with another method of the "successive" class of methods of my invention, as practiced with the system and apparatus of Fig. 4, I first close the valve 59a in order to prevent impurity snow from being entrained with the gas and carried back to the compressor 60 during the operation of charging the vessel G. After the valve 59a has been closed, the valve 63a in the evaporation gas line 63 is opened, and the valve 52a in the liquid carbon dioxide supply line 52 is then opened to admit carbon dioxide through the nozzle 50 into the vessel G, and simultaneously with the admission of liquid carbon dioxide, fluid impurity is injected into the vessel G through the port 51a by opening valve 42a in the impurity supply line 42. The flow and admission of carbon dioxide into the vessel G from the nozzle 50 is, however, limited to admit only approximately the amount of carbon dioxide necessary to freeze the fluid impurity simultaneously discharged into the vessel through the port 51a. For example, if a composite solid carbon dioxide containing fifteen per cent (15%) impurity, such as water, is to be produced to form a one hundred (100) pound cake or block of composite solid, I inject by this step at this stage of the method, fifteen (15) pounds of impurity and approximately only about twenty (20) pounds of liquid carbon dioxide at a temperature of —50° F., which will provide sufficient carbon dioxide to freeze the impurity snow, with only a slight excess of carbon dioxide above that required for freezing the impurity. These steps will result in the production of a loosely packed mass of impurity snow in the solidification vessel containing a very small quantity or amount of carbon dioxide. It will be obvious that when the percentage of impurity to be used is small, such a quantity of impurity when frozen will be in the bottom or lower end of the vessel G as snow, hence, this particular "successive" method only achieves uniform disposition of impurity when the percentage of impurity is high enough to provide a quantity that will form a loose porous mass of ice crystals or snow in the vessel G of approximately the shape and size of the finished block of composite solid carbon dioxide to be produced, and to a greater or lesser degree filling the chamber of the vessel G. However, it will be noted that the carbon dioxide used in freezing the impurity all escapes by filtration through the impurity snow already formed and through the screen or porous plate 62a at the bottom or lower end of the vessel G, so that there is no entrainment of solid impurity in the evaporation gas to be carried into the compression system at this stage of the method. After the step of injecting the required quantity of impurity and freezing the same by the admission of a limited quantity of liquid carbon dioxide, the valves 59a and 60b are opened in the return gas line 59 to the compressor 60, valves 63a being then closed, and the valve 42a in the fluid impurity supply line 42 is closed to shut off further injection of impurity. The system and apparatus are then operated to form and produce a block or cake in accordance with the method disclosed in the Rufener and Eichman Patent 1,818,816. Since the impurity snow or crystals have already been deposited into the vessel G there can be no entrainment of such snow or crystals with the evaporation gases through the line 56 back into the compressor system, as such crystals or snow will remain where they are deposited in the vessel G. Thus from the standpoint of entrainment of solid particles in the system, the above described method of composite solid carbon dioxide production is the preferable one of the several methods of my invention adapted to be carried out with the apparatus and system of Fig. 4.

In accordance with one possible method of my invention of the "simultaneous" class, the impurity and the carbon dioxide are injected continuously and simultaneously into the solidification vessel G, and while I may, if desired, employ the port 51a of the vessel G for the injection of impurities into the vessel, I prefer in this class of method to utilize the liquid carbon dioxide nozzle 50 by injecting the fluid impurity thereinto through the line 65 and the nozzle connection 66 (see Fig. 5) into the expansion chamber 50a of nozzle 50. By thus injecting the impurity directly into the liquid carbon dioxide passing through the nozzle 50, there is a tendency for the carbon dioxide to wet the impurity crystals or snow and to impinge such impurity crystals or snow downwardly against the mass of the product being formed and collected in the solidification vessel G. However, with injection of impurity either through port 51a or through nozzle connection 66 and the nozzle 50, a good composite solid carbon dioxide may be produced by this "simultaneous" method. With this method there is a certain amount of unavoidable entrainment of solid particles in the evaporation or expansion gases when the valves 59a and 60b are open, so that it is desirable to employ a settling tank or tanks, such as the tanks 57 and 58, for entrapping and separating out entrained particles of solid from the gas to prevent their being carried into the compressor 60. A set of settling tanks 57 and 58 are preferably employed in order that one of them may be cut out of the system and warmed to recover the impurities therefrom, while the other settling tank is in normal operation in the system.

A preferred example of a method of my invention of the "intermittent" class, in effect combines the efficiencies and advantageous factors of methods of the "successive" and "simultaneous" methods of my invention hereinbefore described and explained. With such "intermittent" method an even distribution of the impurity through the resulting block of composite solid carbon dioxide is obtained to a degree approaching that of a method of the "simultaneous" class, but such "intermittent" method retains the freedom from the disadvantageous entrainment of particles of solid that is encountered with the "successive" method. In accordance with this "intermittent" class of method, the valves of the system are so operated as to lay down progressive layers of the product in the solidification vessel G each of which layers is formed and produced in accordance with a method of the "successive" class. For example, referring now to Fig. 4, in the first step the valves 59a and 60b are closed and the valve 63a is open and a small increment of impurity is injected into the vessel G either through port 51a or nozzle connection 66 and the injection nozzle 50, together with a sufficient quantity of liquid carbon dioxide to freeze such increment of impurity upon expansion and evaporation of a portion of the liquid. After this step is completed the valves 59a and 60b are opened and sufficient solid carbon dioxide is then deposited to densify the layer of impurity deposited by the foregoing first step, after which valve 52a is closed to shut off admission of liquid carbon dioxide through nozzle 50, and the foregoing steps are repeated in order to deposit another layer of impurity and complete the densification thereof by the formation of a sufficient quantity of solid carbon dioxide. These steps are repeated until a mass or block of composite solid carbon dioxide has been completed. By this method there is a tendency to produce in the finished block of composite solid carbon dioxide, a more or less laminar distribution of impurities, which while for many purposes is not objectionable, yet can be minimized by utilizing a motor driven program valve (not shown) to insure the uniformity of successive layers.

I here direct attention to the fact that I recognize the adaptability of my above methods of producing composite solid carbon dioxide to the methods of solidification and pressing disclosed and described in the U. S. Patent 1,969,169 to Eichman, and my present invention includes such adaptations, which are preferably practiced by injecting the mixture of impurity and carbon dioxide as a very moist or fluid "slush" in order to minimize the undesirable entrainment of solid impurities. The adaptation of my methods to the above referred to Eichman patent is, of course, in fact a special case of the "simultaneous" method of my invention described above, as will be readily recognized.

My present invention also contemplates and includes methods of producing composite solid carbon dioxides in which the solid carbon dioxide is in the form of fine crystals or "snow" produced by the usual or any other method of carbon dioxide snow formation. Such methods are especially adapted for use in solidification apparatus of the type of Fig. 1 of the accompanying drawings, although the practice of the methods is not limited to the use of apparatus of this particular type. In the usual method of carbon dioxide "snow" production in an apparatus of the type of Fig. 1, liquefied carbon dioxide is injected into the solidification and pressing chamber 10 through the liquid inlet or nozzle 16 with the chamber 10 maintained at a pressure below the triple point of carbon dioxide. The liquefied carbon dioxide thus injected into the chamber expands to below the triple point pressure and a portion thereof is frozen out as fine crystals or "snow" while the remainder is converted to gas. Then, after a sufficient quantity of such snow has been accumulated in the chamber 10 it is pressed into a dense block by the usual operation of the pressing plunger 12 of apparatus of the type of Fig. 1.

By one method of my invention for forming a composite solid carbon dioxide from carbon dioxide in "snow" form, a freezable fluid impurity is sprayed in the form of fine particles into the solidification and pressing chamber 10 through a nozzle N or the like, after the temperature within the chamber has been reduced to a temperature sufficiently lower than the freezing temperature of the impurity, to result in substantially instantaneous freezing of the fine particles of fluid impurity upon injection and discharge into the chamber. Injection of fluid impurity is continued until a layer of impurity "snow" or fine crystal form impurity has been deposited and accumulated in the chamber 10. After a layer of impurity snow has been deposited, injection and spraying of fluid impurity is stopped and liquefied carbon dioxide is then injected through inlet 16, the pressure in the chamber 10 being maintained below the triple point of carbon dioxide, so that a portion of the liquefied carbon dioxide is frozen out in the form of carbon dioxide "snow." The injection of liquefied carbon dioxide and production of carbon dioxide "snow" is continued until a layer of a desired quantity and depth of carbon dioxide snow is deposited in the chamber 10 on the previously formed layer of impurity snow. Alternate layers of impurity snow and carbon dioxide snow are formed and built up in the chamber 10 until a mass of desired quantity has been accumulated in the chamber. This mass of alternate layers of impurity snow and carbon dioxide snow is then pressed into dense form by the pressing plunger 12, by the usual operation of plunger 12 in such type of apparatus.

In an alternate method of forming composite solid carbon dioxide from carbon dioxide "snow," the injection of liquid carbon dioxide and fluid impurity may be carried on simultaneously to produce carbon dioxide "snow" and impurity "snow," by maintaining the chamber pressure below the triple point but at a temperature sufficiently lower than the freezing temperature of the fluid impurity to cause the fine particles of the latter being sprayed into the chamber, to substantially instantly freeze under such temperature conditions. After a desired quantity of the mixture of impurity "snow" and carbon dioxide "snow" has been accumulated in the chamber 10, the mass is then pressed into a block of high density composite solid carbon dioxide in the chamber in which formed and in the position in which deposited, by the operation of the pressing plunger 12 in a manner hereinbefore referred to and described in connection with Fig. 1 of the drawings.

The methods of producing composite solid carbon dioxide and the composite solid carbon dioxide produced thereby are not in all respects limited or confined to the use of any specific impurity or impurities beyond the general limitation that requires the impurity to have a freezing point higher than the temperature of the liquid carbon dioxide into which the impurity is to be injected or by which the impurity is to be frozen, and the further limitations imposed by the characteristics required of the composite solid carbon dioxide made with such impurities. For, example, among the specific impurities which may be employed with particular reference to the production of those composite solid carbon dioxides which are to develop and automatically maintain an insulating blanket enclosing a block of the composite solid during evaporation or sublimation thereof, may be mentioned water and various water solutions of organic chemical or other compounds, such for example as water solutions of methanol and ethanol, in which the water solution contains say 5 to 10% of the methanol or ethanol and has a resulting freezing temperature lower than 25° F. Preferably, the organic chemical or compound will be such as will leave no objectional residue upon melting such for example as ethanol or methanol specifically referred to above.

Various oils and similar substances may be employed as the impurity in order to obtain a composite solid carbon dioxide having certain specific characteristics. In this connection it should be here pointed out that preferably the liquid carbon dioxide as referred to hereinbefore, may be the usual high quality commercial liquid carbon dioxide produced under conditions such that the liquid carbon dioxide contains practically no undissolved impurities, although the methods of the invention are not limited to use only with such character of "pure" liquid carbon dioxide. In connection with that phase of the invention which provides a composite block for the handling and application of volatile toxic or odorous substances, it is to be understood that such substances are those having a low vapor pressure at the temperature of solid carbon dioxide.

What I claim is:

1. The method of making solid carbon dioxide containing added impurities, which includes the steps of; admitting liquefied carbon dioxide into a chamber through an inlet opening therein while maintaining the chamber during admission at a pressure at or above the triple point pressure of carbon dioxide; and injecting into the said chamber through an injection opening that is separate from the opening in the chamber through which the liquefied carbon dioxide is admitted, an impurity having a freezing temperature higher than the temperature of the liquefied carbon dioxide being admitted into the chamber.

2. The method of making solid carbon dioxide containing added impurities, which includes the steps of; admitting liquefied carbon dioxide into a chamber while maintaining the chamber during admission of the liquefied carbon dioxide at a pressure at or above the triple point pressure of carbon dioxide; after a quantity of liquefied carbon dioxide is collected in the chamber, injecting into the collected body of liquefied carbon dioxide in the chamber, an impurity having a freezing temperature higher than the temperature of the liquefied carbon dioxide admitted into the chamber; stopping admission of liquefied carbon dioxide into the chamber after a desired quantity thereof has been collected in the chamber while continuing the injection of impurity; solidifying the body of liquefied carbon dioxide collected in the chamber by evaporation of the liquefied carbon dioxide in the chamber at the triple point pressure of carbon dioxide; and stopping the injection of impurity into the chamber after a period of evaporation of the liquefied carbon dioxide at the triple point and prior to complete solidification of the carbon dioxide in the chamber.

3. The method of making solid carbon dioxide containing particles of an added impurity in the frozen state, which includes the steps of; maintaining a body of liquefied carbon dioxide in a chamber; atomizing a fluid impurity which has a freezing temperature higher than the temperature of the liquefied carbon dioxide in the chamber and injecting fine particles of the atomized fluid impurity into the body of liquefied carbon dioxide in the chamber, and then solidifying the liquefied carbon dioxide in the chamber.

4. The method of making solid carbon dioxide containing impurities, which includes the steps of; maintaining a body of liquefied carbon dioxide in a chamber in liquid or partially liquid state; injecting impurities into the body of liquefied carbon dioxide maintained in the chamber, and then solidifying the liquefied carbon dioxide in the chamber.

5. The method of making a composite solid carbon dioxide containing impurities in the form of fine particles dispersed in the frozen state through the solid carbon dioxide, which includes the steps of; maintaining a body of liquefied carbon dioxide in a chamber in liquid or partially liquid state; injecting impurities having a freezing temperature higher than the temperature of the body of liquefied carbon dioxide, into the body of liquefied carbon dioxide maintained in the chamber; and then solidifying the liquefied carbon dioxide in the chamber.

6. The method of making a composite refrigerant by solidifying carbon dioxide in intimate association with a substantial percentage of another ingredient having much higher melting and evaporation temperatures than solidified carbon dioxide, which includes the steps of; adding such other ingredient to the carbon dioxide while the latter is in the liquid state prior to the solidification thereof and is at a temperature lower than the freezing temperature of such ingredient to freeze such added ingredient in the liquefied carbon dioxide; and then solidifying the liquid carbon dioxide having such other ingredient in frozen state therein to produce a composite refrigerant having a character such that upon evaporation an insulating blanket of such frozen ingredient is formed and maintained covering the composite refrigerant during evaporation thereof to thereby effect a thermostatic control of the temperature of a space in which said composite refrigerant is located.

7. The method of making a composite refrigerant by solidifying carbon dioxide in itimate association with a substantial percentage of another ingredient having much higher melting and evaporation temperatures than solidified carbon dioxide, which includes the steps of; adding such other ingredient to the carbon dioxide while the latter is in the liquid state prior to the solidification thereof and is at a lower temperature than the freezing temperature of such other ingredient, by spraying such ingredient in atomized, finely divided form into the liquefied carbon dioxide so that the fine particles of such other ingredient are dispersed throughout the liquefied carbon dioxide as small particles of frozen ingredient; and then solidifying the liquefied carbon dioxide to form a mass of composite refrigerant.

8. The method of making a carbon dioxide refrigerant, which includes the steps of; injecting a quantity of freezable impurity in the form of fine particles into liquefied carbon dioxide to be solidified prior to the solidification of the liquefied carbon dioxide, in an amount too great to dissolve in the liquefied carbon dioxide; so that the injected impurity freezes therein to form finely divided frozen particles suspended in cold liquefied carbon dioxide prior to the solidification of the liquefied carbon dioxide; and then solidifying the liquefied carbon dioxide.

9. The method of injecting fluid impurities into liquefied carbon dioxide maintained in the liquid state, which includes the steps of; carbonating the impurities at a pressure higher than the pressure at which the liquefied carbon dioxide is being maintained; and then spraying the carbonated impurities into the body of liquefied carbon dioxide prior to the solidification of the latter.

10. The method of making a solid carbon dioxide mixture, which includes the steps of; admitting liquefied carbon dioxide containing substantially no undissolved impurities therein into a chamber maintained at or above the triple point pressure of carbon dioxide, through an inlet opening in the chamber; injecting through an opening in the chamber separate from the inlet opening for the liquefied carbon dioxide, another ingredient in fluid form having a freezing temperature higher than the temperature of the liquefied carbon dioxide and containing practically no undissolved carbon dioxide therein; and then solidifying the resultant suspension of frozen ingredient in the liquefied carbon dioxide by lowering the pressure on the liquefied carbon dioxide in the chamber.

11. The method of making a solid mixture containing solid carbon dioxide, which consists in the steps of; maintaining a body of liquefied carbon dioxide in a chamber at a pressure greater than sixty (60) pounds gauge pressure; injecting a material in fluid form which has a freezing temperature higher than the temperature of the body of liquefied carbon dioxide, into the chamber under the surface of the body of liquefied carbon dioxide being maintained in the chamber; reducing the pressure in the chamber to solidify the liquefied carbon dioxide; and then pressing the resultant mixture of solid carbon dioxide and added material into a dense strong block.

12. In a method of forming composite solid carbon dioxide containing added impurities, that step which consists in injecting the impurities under the surface of a body of cold, relatively pure liquefied carbon dioxide prior to the solidification of the liquefied carbon dioxide.

13. In a method of injecting impurities into carbon dioxide solidification apparatus, that step which consists in, injecting the impurities under the surface of a bath of cold relatively pure liquid carbon dioxide already formed or forming.

14. In a method of forming composite solid carbon dioxide from liquid carbon dioxide and an impurity added thereto, that step which consists in, adding the impurity in fluid form to the liquefied carbon dioxide prior to the solidification of the liquefied carbon dioxide.

15. In a method of producing a composite solid carbon dioxide consisting of solid carbon dioxide and of frozen impurity dispersed therethrough, that step which consists in, injecting an impurity which has a freezing temperature higher than the temperature of the liquefied carbon dioxide into the liquefied carbon dioxide prior to the solidification of the liquefied carbon dioxide.

16. In a method of producing a composite solid carbon dioxide which consists of solid carbon dioxide and a frozen impurity dispersed therethrough, that step which consists in, injecting an impurity having a freezing temperature higher than the temperature of the liquefied carbon dioxide into the liquefied carbon dioxide prior to the solidification of the latter in a quantity greater than can be dissolved in the liquefied carbon dioxide.

17. In a method of forming composite solid carbon dioxide, the steps of; injecting the carbon dioxide into a chamber as a wet snow or "slush"; injecting finely divided freezable impurity into said chamber through a separate injection nozzle; and then solidifying the liquefied carbon dioxide in the resultant mixture in the chamber to produce a mass of composite solid carbon dioxide.

18. In a method of forming composite solid carbon dioxide, the steps of; injecting the carbon dioxide into a chamber as a wet snow or "slush"; injecting finely divided freezable impurity into said chamber and then solidifying the liquefied carbon dioxide in the resultant mixture in the chamber to produce a mass of composite solid carbon dioxide.

19. In a method of forming composite solid carbon dioxide, the steps of; injecting carbon dioxide through an injection nozzle into a chamber as a wet snow or "slush" with the chamber pressure maintained at or above the triple point pressure of carbon dioxide; injecting finely divided freezable impurity into and commingling the impurity with the expanding carbon dioxide in the carbon dioxide injection nozzle.

20. In a method of forming a composite solid carbon dioxide, the steps of; injecting carbon dioxide into a chamber through an injection nozzle as a wet snow or "slush"; injecting finely divided freezable impurity into the carbon dioxide in said injection nozzle for commingling with the carbon dioxide discharging therefrom into said chamber; and then solidifying the liquefied carbon dioxide in the resultant mixture of carbon dioxide and impurities in said chamber.

21. The method of forming a block of composite solid carbon dioxide, which consists in the steps of; first depositing a porous mass of frozen crystals of a freezable impurity; and then filling the interstices of the pre-formed mass of impurity crystals with crystalline solid carbon dioxide.

22. The method of forming a block of composite solid carbon dioxide, consisting in the steps of; forming a porous mass of frozen crystals of a freezable impurity; depositing such pre-formed mass into a chamber; filling the interstices of the mass in said chamber with liquefied carbon dioxide; and then solidifying the liquefied carbon dioxide to fill the interstices of the pre-formed mass of impurity crystals with crystalline solid carbon dioxide.

23. The method of forming a block of composite solid carbon dioxide which consists in the steps of; alternately depositing layers of porous crystalline freezable impurity; and depositing relatively pure solid carbon dioxide to fill the voids in such alternately formed layers.

24. The method of forming a block of solid carbon dioxide containing freezable impurities, which consist in the steps of; depositing carbon dioxide in a chamber as a wet snow or "slush"; and injecting freezable impurities having a freezing temperature higher than the temperature of the carbon dioxide "slush," into the entering carbon dioxide "slush."

25. The method of injecting freezable impurities into a carbon dioxide solidification chamber, which includes the steps of; continuously circulating relatively warm fluid impurities through a spray nozzle mounted for discharging fluid impurities into the solidification chamber in order to prevent freezing of fluid impurities and resulting obstruction to circulation of fluid impurities through the nozzle when spraying through the nozzle is not taking place; and intermittently closing or throttling the fluid outlet from the nozzle to build up therein sufficient pressure to blow clear any local freezing of fluid impurity in and closing the nozzle discharge orifice and to spray freezable impurity in finely divided form through the nozzle discharge orifice into the solidification chamber.

26. In apparatus for producing composite solid carbon dioxide, in combination, a structure forming a chamber for the solidification therein of liquefied carbon dioxide, an injection nozzle mounted in said structure for spraying fluid impurities into said chamber for freezing of said impurities by and for admixture thereof with carbon dioxide in the chamber, said nozzle embodying a closed body providing a fluid impurity receiving chamber therein for circulation of fluid therethrough and having a fluid impurity discharge orifice through the inner end wall thereof for spraying fluid impurity into said solidification chamber, and a fluid impurity supply system connected with said nozzle, said system including, a fluid impurity supply tank, a supply conduit from said tank connected into said nozzle body for supplying fluid to the nozzle chamber, a return flow conduit connected into the nozzle body for receiving fluid from the nozzle chamber, said return flow conduit being connected and discharging into said supply tank, means for forcing fluid impurity under pressure from said supply tank through said supply line into the nozzle chamber, and means for closing or throttling the return flow conduit to cause pressure to build up in said nozzle chamber to spray fluid impurity through said nozzle discharge orifice into said solidification chamber.

27. In apparatus for producing composite solid carbon dioxide, in combination, a structure forming a chamber for the solidification therein of liquefied carbon dioxide, an injection nozzle mounted in said structure for spraying freezable fluid impurities into said chamber, said nozzle formed to provide a fluid impurity discharge orifice for spraying fluid impurity into said solidification chamber, and a fluid impurity supply system connected with said nozzle, said system including a source of fluid impurity supply, a supply conduit from said source to said nozzle for supplying fluid to the latter, a return flow conduit from said nozzle for returning fluid therefrom to said source, and means for forcing fluid impurity under pressure through said supply conduit to said nozzle.

28. In apparatus for producing composite solid carbon dioxide, in combination, a structure forming a chamber for the solidification therein of liquefied carbon dioxide, an injection nozzle mounted in said structure for spraying freezable fluid impurities into said chamber, said nozzle being formed to provide a fluid impurity discharge orifice for spraying fluid impurity in finely divided form into said solidification chamber, a source of fluid impurity, a supply conduit from said source to said nozzle for supplying fluid impurity thereto, a fluid impurity return flow conduit from said nozzle to said source, means for circulating fluid impurity from said source, through said nozzle and from said nozzle back to said source through said supply conduit, and means for controlling the return flow of fluid from said nozzle to vary the pressure on the fluid in said nozzle.

29. In apparatus for producing composite solid carbon dioxide, in combination, a structure forming a chamber for the solidification therein of liquefied carbon dioxide, a discharge nozzle mounted in said structure for spraying freezable fluid impurities into said solidification chamber, a source of fluid impurity, a supply conduit from the source to said nozzle, a return flow conduit for retrning fluid impurity from the nozzle to said source, means for circulating fluid from the source through said supply conduit and the nozzle and back to the source through said return flow conduit, and means for controlling the return flow of fluid from said nozzle to vary the pressure on the fluid in the nozzle.

30. In apparatus for producing composite solid carbon dioxide, in combination, a structure forming a chamber for the solidification therein of liquefied carbon dioxide, an injection nozzle mounted in said structure for spraying freezable fluid impurities into said solidification chamber, said nozzle being formed to provide an atomizing discharge orifice for spraying fluid impurity in finely divided form into said solidification chamber, a source of fluid impurity, a supply conduit from said source to and discharging fluid into said nozzle, a return flow conduit from said nozzle to said source, means for circulating fluid impurity from said source through said supply conduit and nozzle and back to said source through said return flow conduit, and valve means for reducing flow of fluid from the nozzle through said return flow conduit to thereby increase the pressure on the fluid in said nozzle to a magnitude to spray fluid under pressure through said atomizing discharge orifice.

31. In apparatus for producing composite solid carbon dioxide, in combination, a structure forming a chamber for the solidification therein of liquefied carbon dioxide, a discharge nozzle mounted in said structure for spraying freezable fluid impurities into said solidification chamber, a fluid impurity supply tank, a fluid impurity supply conduit from said supply tank to said nozzle for supplying fluid impurity thereto, and means for supplying carbon dioxide under pressure to said supply tank for carbonated fluid impurities in said tank and for forcing said carbonated impurities from said tank to said nozzle and through the nozzle discharge orifice.

32. A nozzle apparatus for spraying freezable fluid impurities in finely divided form into the solidification chamber of a carbon dioxide solidification apparatus, said nozzle apparatus including a tubular body member providing a fluid impurity reeciving and circulating chamber therewithin closed at its discharge end by a wall having a discharge orifice therethrough, the opposite intake end of said nozzle body being closed, a fluid impurity supply conduit connected to said body member and discharging into said chamber, a fluid impurity discharge port in said body member in communication with said chamber for connection with a fluid impurity return flow conduit, and said wall at the discharge end of said body member at the discharge orifice therethrough having a thickness such that the length of said orifice is such that a plug of frozen impurity in and closing said orifice will be forced therefrom to clear and open the orifice by pressures within said chamber of the order of magnitude one thousand pounds (1000 lbs.) per square inch.

33. The method of making solid carbon dioxide containing added impurities, which includes the steps of; admitting liquefied carbon dioxide into a chamber while maintaining the chamber during admission of the liquefied carbon dioxide at a pressure below the triple point pressure of carbon dioxide to produce a mass of carbon dioxide snow; stopping admission of liquid carbon dioxide and formation of carbon dioxide snow; injecting into the chamber a fluid impurity having a freezing temperature higher than the temperature of the chamber in order to form and deposit a quantity of impurity snow on the previously formed quantity of carbon dioxide snow; continuing such alternate formation and depositing of carbon dioxide snow and impurity snow to form alternate layers thereof until a mass of desired quantity has been accumulated in the chamber; and then pressing such mass of carbon dioxide snow and impurity snow into a block.

34. The method of making solid carbon dioxide containing added impurities, which includes the steps of; admitting liquefied carbon dioxide into a chamber while maintaining the chamber during admission of the liquid carbon dioxide at a pressure below the triple point pressure of carbon dioxide to form carbon dioxide snow in the chamber; simultaneously with the admission of the liquid carbon dioxide and the formation of carbon snow in the chamber, injecting into the chamber a fluid impurity in finely divided form having a freezing temperature higher than the temperature of the chamber to freeze said injected impurity into snow form; stopping admission of liquefied carbon dioxide and injection of fluid impurity after a desired mass of carbon dioxide snow and impurity snow has been accumulated in the chamber; and then pressing said mass in the same chamber while in the position in which deposited therein, into a block of high density composite solid carbon dioxide.

35. The method of making solid carbon dioxide containing added impurities, which includes the steps of; admitting liquefied carbon dioxide into a chamber while maintaining the chamber during admission of the liquefied carbon dioxide at a pressure at or above the triple point pressure of carbon dioxide; and simultaneously with the admission of the liquified carbon dioxide into the chamber injecting into the chamber an impurity having a freezing temperature higher than the temperature of the liquefied carbon dioxide in the chamber.

36. The method of making solid carbon dioxide containing added impurities in the frozen state, which includes the steps of; admitting liquefied carbon dioxide into a chamber while maintaining the chamber at or above the triple point pressure of carbon dioxide during the admission of the liquefied carbon dioxide; injecting into the carbon dioxide in the chamber fine particles of a fluid impurity having a freezing point higher than the freezing point of the carbon dioxide in the chamber; and then solidifying in the chamber the liquefied carbon dioxide containing such particles of impurity to form the composite solid carbon dioxide.

CHARLES L. JONES.

REFERENCES CITED

The following references are of record in the file of this patent:

UNITED STATES PATENTS

| Number | Name | Date |
| --- | --- | --- |
| 1,675,002 | Steiner | June 26, 1928 |
| 1,818,816 | Rufener | Aug. 11, 1931 |
| 1,927,175 | Josephson | Sept. 19, 1933 |
| 2,020,189 | Jones | Nov. 5, 1935 |